(12) United States Patent
Milburn et al.

(10) Patent No.: US 9,071,628 B2
(45) Date of Patent: Jun. 30, 2015

(54) METHOD AND APPARATUS FOR MANAGING BANDWIDTH BY MANAGING SELECTED INTERNET ACCESS BY DEVICES IN A WI-FI LINKED AUDIENCE

(71) Applicants: Andrew Milburn, Los Angeles, CA (US); Thomas Hajdu, Santa Barbara, CA (US)

(72) Inventors: Andrew Milburn, Los Angeles, CA (US); Thomas Hajdu, Santa Barbara, CA (US)

( * ) Notice: Subject to any disclaimer, the term of this patent is extended or adjusted under 35 U.S.C. 154(b) by 125 days.

(21) Appl. No.: 13/895,290

(22) Filed: May 15, 2013

(65) Prior Publication Data

US 2013/0310083 A1    Nov. 21, 2013

Related U.S. Application Data

(60) Provisional application No. 61/648,593, filed on May 18, 2012, provisional application No. 61/670,754, filed on Jul. 12, 2012, provisional application No. 61/705,051, filed on Sep. 24, 2012, provisional application No. 61/771,629, filed on Mar. 1, 2013, provisional application No. 61/771,646, filed on Mar. 1, 2013, provisional application No. 61/771,690, filed on Mar. 1, 2013, provisional application No. 61/771,704, filed on Mar. 1, 2013.

(51) Int. Cl.
*H04L 29/08* (2006.01)
*H04N 5/04* (2006.01)
*H04L 29/06* (2006.01)
*G11B 27/034* (2006.01)
*G11B 27/10* (2006.01)
*H04W 4/20* (2009.01)
*G10L 21/10* (2013.01)
*H04W 4/06* (2009.01)
*H04W 4/02* (2009.01)
*G10L 25/03* (2013.01)

(52) U.S. Cl.
CPC .............. *H04L 67/1095* (2013.01); *H04N 5/04* (2013.01); *H04L 65/4076* (2013.01); *H04W 4/06* (2013.01); *H04W 4/02* (2013.01); *H04L 65/403* (2013.01); *H04L 67/10* (2013.01); *G11B 27/034* (2013.01); *G10L 25/03* (2013.01); *G11B 27/105* (2013.01); *H04W 4/206* (2013.01); *G10L 21/10* (2013.01)

(58) Field of Classification Search
CPC ....................................................... H04W 4/06
USPC ....................................................... 455/456.3
See application file for complete search history.

(56) References Cited

U.S. PATENT DOCUMENTS

| | | | |
|---|---|---|---|
| 8,402,356 B2 * | 3/2013 | Martinez et al. | 715/201 |
| 2012/0239526 A1 * | 9/2012 | Revare | 705/26.8 |

* cited by examiner

*Primary Examiner* — Diane Mizrahi (57) ABSTRACT

A central controller associated with a performance interacts with portable interactive devices such as smartphones in a venue to provide a shared user experience. The controller may be linked to portable interactive devices by a Wi-Fi link in the venue. Additionally, the controller may need to interface with the outside world via the Internet to add information to the experience. In order to prevent excessive bandwidth demands on the Internet connection, a URL filter is coupled to block all requests for connection to the Internet except those required for running the interactive system or device and transferring information. The filter permits access to a limited number of specific URLs for selected social networks, e.g., Facebook®. Permitted data is throttled to a low data rate so that it is acquired over time. It is unnecessary to gather the data in real time. Consequently, bandwidth requirements are minimized.

14 Claims, 5 Drawing Sheets

| NAME OF OPERATION | CORRESPONDING URLS |
|---|---|
| TRANSMIT VIDEO | BLOCK ALL URLS |
| TRADE PICTURES | ALLOW ACCESS TO FACEBOOK |
| XXX | YYY |
| XXX | YYY |
| XXX | YYY |

| NAME OF OPERATION | CORRESPONDING URLS |
|---|---|
| TRANSMIT VIDEO | BLOCK ALL URLS |
| TRADE PICTURES | ALLOW ACCESS TO FACEBOOK |
| XXX | YYY |
| XXX | YYY |
| ... | ... |
| XXX | YYY |

FIG. 4

METHOD AND APPARATUS FOR MANAGING BANDWIDTH BY MANAGING SELECTED INTERNET ACCESS BY DEVICES IN A WI-FI LINKED AUDIENCE

CROSS REFERENCE TO RELATED APPLICATIONS

This patent application claims priority of Provisional Patent Application 61/648,593 filed May 18, 2012, Provisional Patent Application 61/670,754 filed Jul. 12, 2012, Provisional Patent Application 61/705,051 filed Sep. 24, 2012, Provisional Patent Application 61/771,629 filed Mar. 1, 2013, Provisional Patent Application 61/771,646 filed Mar. 1, 2013, Provisional Patent Application 61/771,690 filed Mar. 1, 2013, and Provisional Patent Application 61/771,704 filed Mar. 1, 2013, the disclosures of which is each incorporated by reference herein in its entirety.

BACKGROUND OF THE INVENTION

1. Field of the Invention

The present subject matter relates to managing Internet interface bandwidth requirements by managing selected internet access by devices in a Wi-Fi linked audience.

2. Related Art

An increasingly popular form of concert entertainment includes the provision of an enhanced experience to concert goers. In addition to provision of the concert and any visual effects is the provision of displays or other content to portable interactive client devices such as smartphones.

For example, U.S. Pat. No. 8,402,356 discloses systems, methods, and apparatus for collecting data and presenting media to a user. The systems generally include a data gathering module associated with an electronic device. The data gathering module communicates gathered data to a management module, which manages at least one user profile based on the gathered data. The management module may select media for presentation to a user based on the user profile, and the selected media may be displayed to the user via a media output device co-located with the user, such as a display of the user's mobile electronic device or a television, computer, billboard, or other display co-located with the user. Related methods are also provided.

United States Patent Application Publication No. 2012/00239526 discloses an interactive method and apparatus which provides interaction between a performer and concert attendees. The performer enters concert information into a server, which is then accessed wirelessly by a concert attendee. Animations from the server are dynamically displayed on the electronic device. In this arrangement, attendees may select to download a song or view the lyrics. The user may select an encore screening to vote on a song to be played during an encore performance. In this arrangement, the attendee interacts only with previously stored information. There is no new information generated to enhance the performance. In order to combine further information sources, whether local or accessed through the Internet, the system must provide sufficient bandwidth or delays and gaps in the data will occur. In the past, it has generally been impossible to provide sufficient bandwidth through a venue connection. Possible interactions between a performer and an audience are greatly limited.

SUMMARY

Briefly stated, in accordance with the present subject matter, there are provided a method, apparatus, and non-transitory machine-readable medium operating a central controller to interact with portable interactive devices such as smartphones in a venue to provide a shared user experience. The controller may be linked to portable interactive devices by a Wi-Fi link in the venue. Additionally, the controller may need to interface with the outside world via the Internet to add content to the experience. In order to prevent excessive bandwidth demands on the Internet connection, a URL filter is coupled to block all requests from smartphones for connection to the Internet except those required for running the interactive system or device and transferring content. The filter permits access to a limited number of specific URLs. Permitted data is throttled to a low data rate so that it is acquired over time. It is unnecessary to gather the data in real time. Consequently, bandwidth requirements are minimized.

Permitted data is throttled to a low data rate so that it is acquired over time. It is unnecessary to gather the data in real time. When receipt of the requested data is completed, status is reported to the controller.

BRIEF DESCRIPTION OF THE DRAWINGS

The present subject matter may be further understood by reference to the following description taken in connection with the following drawings:

FIG. 1, consisting of FIGS. 1A and 1B, is an illustration of the method and apparatus of the present subject matter operating in a venue;

DETAILED DESCRIPTION

Figure 1A:
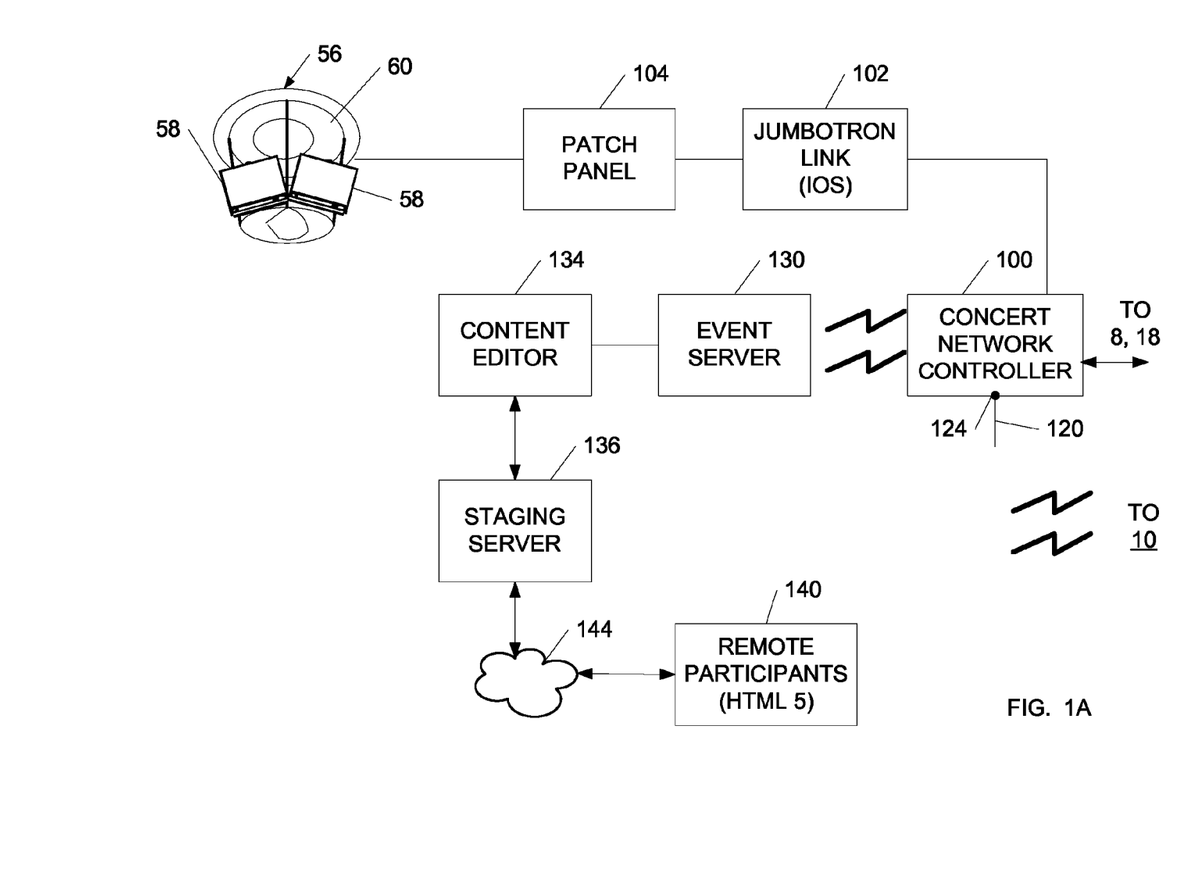
Figure 1B:
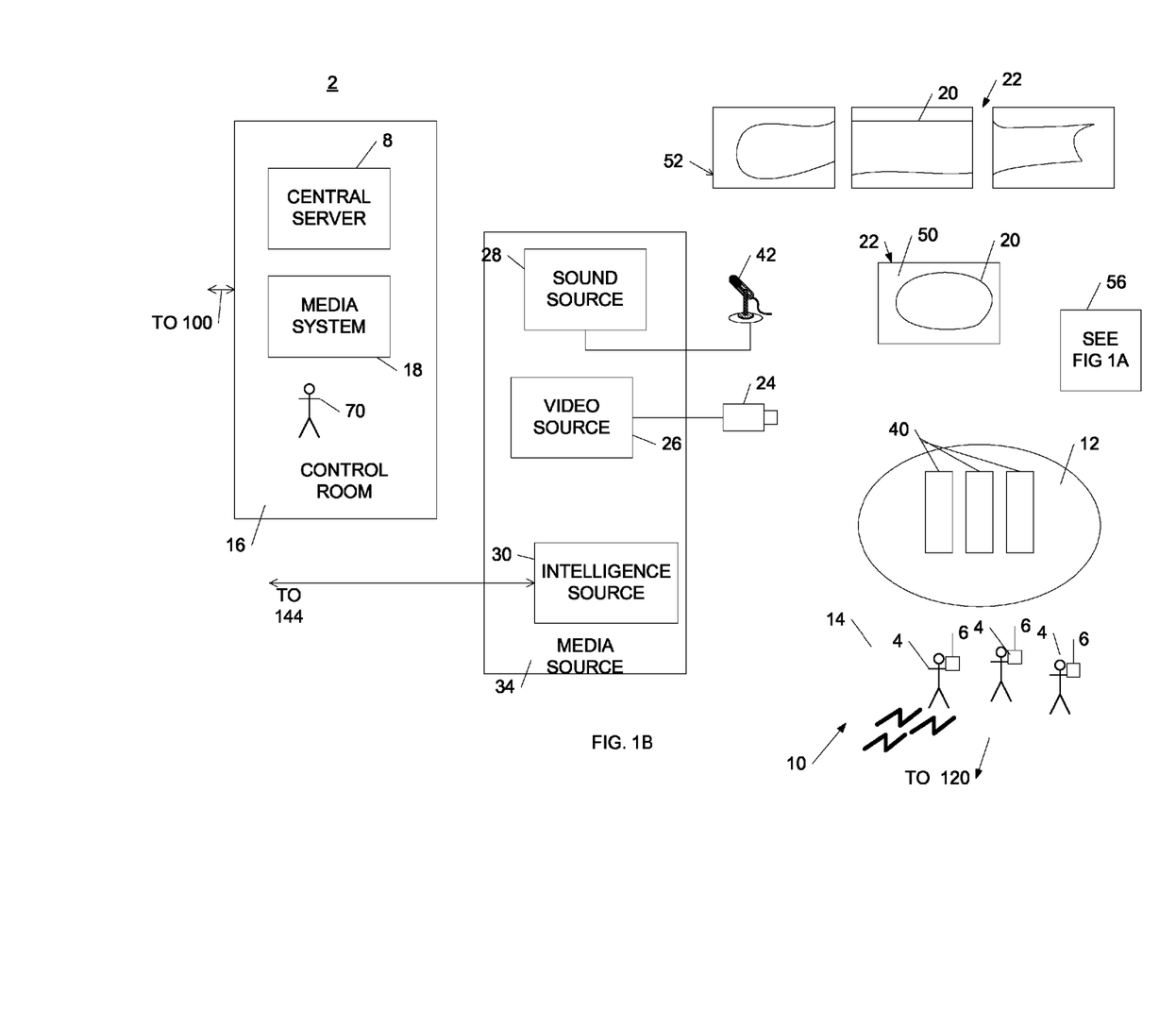
Figure 2:
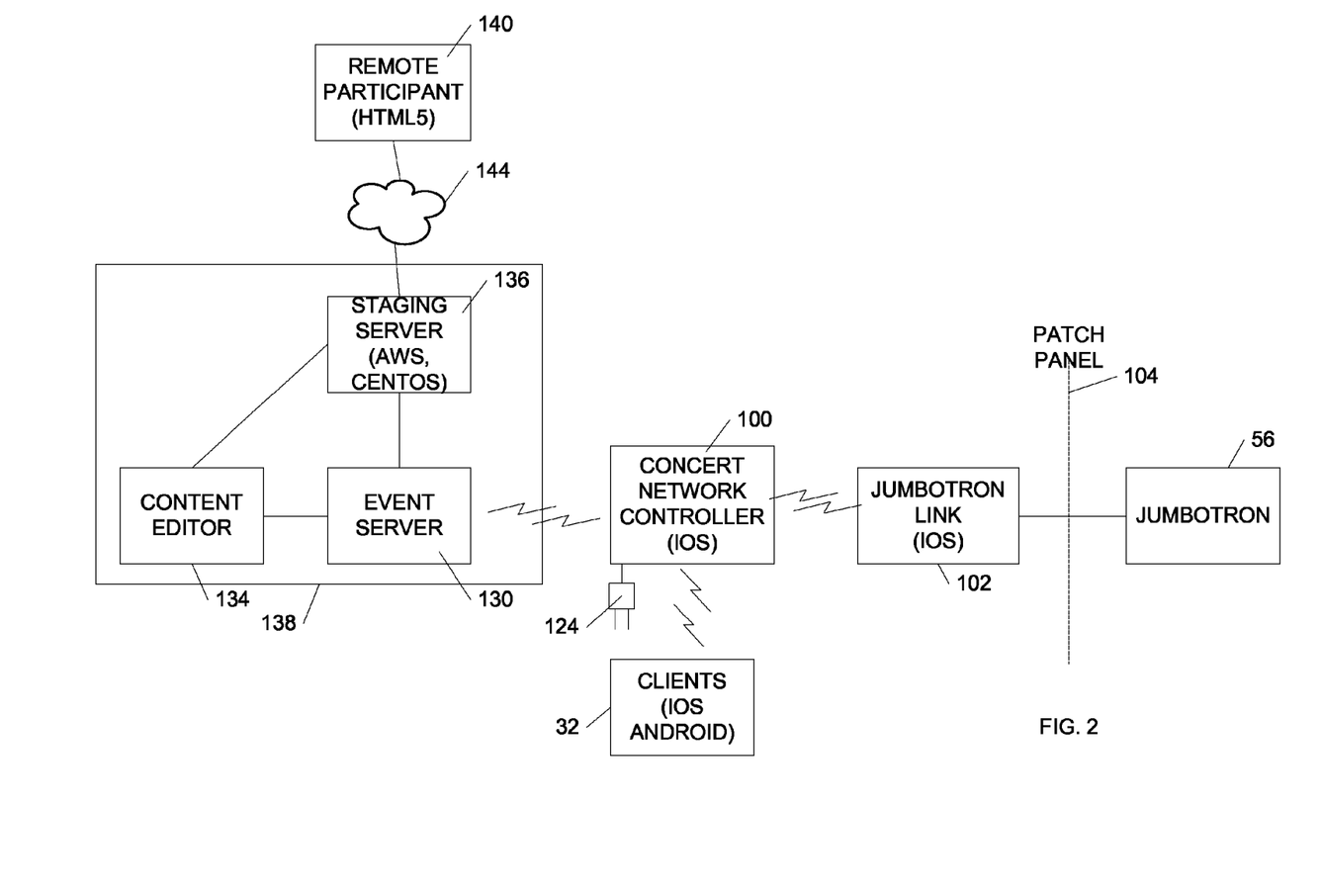
FIG. 2 is a block diagram of the system illustrated in FIG. 1.

FIG. 1, consisting of FIGS. 1A and 1B, is an illustration of a venue 10 comprising a system 2 in accordance with the present subject matter. FIG. 2 is a high-level block diagram of communication paths in the system illustrated in FIG. 1. FIGS. 1 and 2 are discussed at the same time. The system 2 may be used in conjunction with a live event, for example a concert. Two-way interactivity is provided between a central server 8 and individual audience members 4 who may each have a portable device 6. The portable device 6 may be a smartphone, tablet, or other device. The present subject matter addresses providing reliable, high-capacity interaction in a highly efficient manner. The present subject matter provides for both reaching substantially an entire audience physically and for efficiently managing communications by "offloading" connections from a higher demand location to a lower demand location.

The venue 10 may include a stage 12, audience area 14, a control room 16, and a media system 18 which may be located in the control room 16. The media system 18 receives audio, video, and intelligence from sources and may be operated to perform control room functions such as mixing, selecting, and processing. A video program 20 is shown on a display 22.

The media system 18 is used to couple outputs from a video source 26, a sound source 28, and other intelligence source 30. The video source 26 may comprise one or more television cameras 24. In the present illustration, an audio-video unit 34 includes the video source 26, sound source 28, and other intelligence source 30. The sound source 28 comprises audio output from a live performance provided by a performer or performers 40 coupled by transducers 42, such as microphones. Alternatively, one or more of the video source 26, the sound source 28, and other intelligence source 30 may comprise sources of streaming content, prerecorded content, stored data, or currently processed content from any source. These sources may be local, remote, or both.

In one preferred form the display 22 is a screen 50 that comprises a backdrop for the stage 12. The display 22 could comprise an array 52 of screens over which the video program 20 is distributed. In another form, often used in arenas, the display 22 could comprise a display unit 56 which includes a plurality of monitors 58 on one support 60, with each monitor 58 facing in a different direction. Examples of the display unit 56 are available under the trademark Jumbotron®.

The media system 18 is operated by a VJ 70. The VJ 70 may comprise one or more personnel or a programmed computer. It is not essential that the control room 18 be located at the venue 10. The media system 18 provides content to a concert network controller 100. The concert network controller 100 may both receive and transmit information. The concert network controller 100 provides an input to a display link 102, which is coupled by a patch panel 104 to the display unit 56.

The concert network controller 100 may also comprise a Wi-Fi hotspot 120 providing and receiving signals to and from the audience area 14. As further described below, content may be provided both to and from audience members 4. The concert network controller 100 may also interact with remote participants 140. In another form, a Wi-Fi system 124, discussed below with respect to FIG. 2, couples audience members 4 to interact with the system 2.

The concert network controller 100 is preferably wirelessly connected to an event server 130, which can provide communications between remote participants 140 and the concert network controller 100. The event server is coupled to a content editor 134, which interacts with a staging server 136. The staging server 136 may be coupled to the remote participants 140 by a network, for example, the Internet 144.

Communications will be provided between a target system and a source system. In the present description, "source system" is a device that wishes to send a message to a "target system." The target system is a device that is configured to receive sent messages via its operating-system provided from a network connection sub-system. The business logic running on the device can select as-needed to operate as the target or the source system at any moment. Operating as a source system or target system for a particular messaging transaction does not preclude operating as the other system for a different messaging transaction simultaneously.

The system is interactive between the concert network controller 100 and one or both of the remote participants 140 and local participants 4. The concert network controller 100 and one or both of the remote participants 140 and local participants 4 may be a source when another is a target. The target and source system roles can be assumed by each device within the present subject at different times and without requiring reconfiguration.

In a nominal application, thousands of portable user devices 6 may communicate with the concert network controller 100. The communication will provide interaction for intended uses of the system 2. This alone could strain resources and require expensive T1 access lines far beyond the capacity normally utilized within a concert venue. Providing such capacity would be both expensive and impractical.

Since users 4 have the option to operate their portable user devices 6 in order to access the Internet and to access cell phone services, bandwidth demands in prior art systems are potentially unlimited. This can overload capacities of communications links at venues. It is important to limit bandwidth requirements to enable accommodating a large number of portable user devices 6. In accordance with the present subject matter, limiting bandwidth requirements is accomplished by disabling access to applications that are not part of the entertainment functions of the system 2. For purposes of the present description, the applications, contributing to functioning of the system 2 are referred to as business logic.

Business logic comprises software for a number of functions. The system 2 may send video displays to the screens of portable user devices 6. In various forms of the present subject matter, the business logic may operate to individualize communications. Therefore, certain functions, such as retrieving user-specific data such as a social networking profile (e.g., a Facebook® profile) are considered to be business logic.

The system 2 limits required bandwidth by limiting access to the communications link, as by filtering. Additionally, decisions may be made about information, which does or does not need to be accessed in real time, but which may be accessed piecemeal. Consequently, the bandwidth that would be needed for rapid download is not required.

Figure 3:
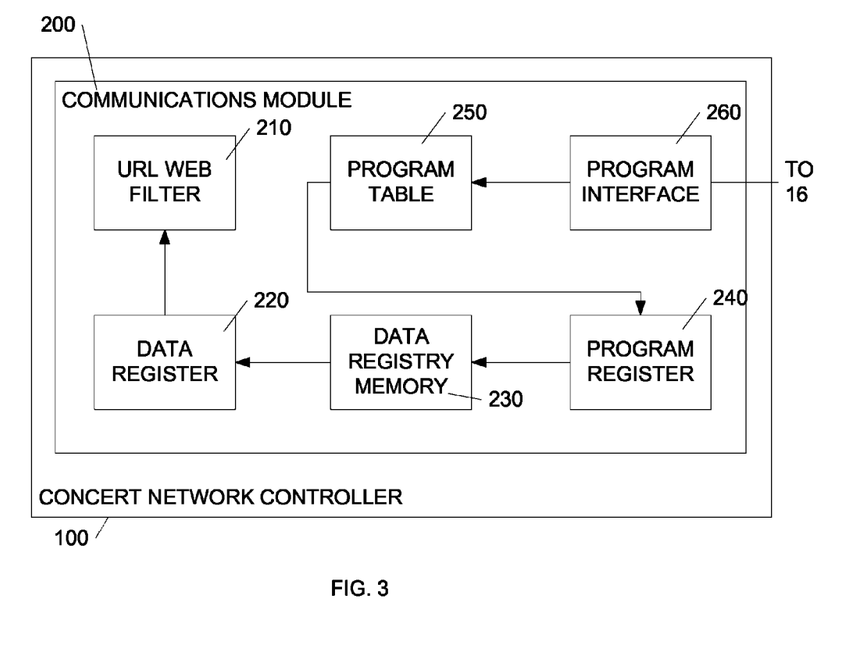
FIG. 3 is a block diagram of a concert network controller with a communications module.

FIG. 3 is a block diagram of a concert network controller 100 with a communications module 200 which is utilized to filter and regulate communications. The communications module 200 may be located in components other than the concert network controller 100. The illustration of the communications module in the concert network controller 100 is simply illustrative of possibilities, and is not limiting.

Optimization of bandwidth use, i.e., available bandwidth versus number of users that can be accommodated, is achieved by using a combination of a URL Internet filter, compression algorithms, a staging server, and rules to limit message propagation not needed for producing the enhanced composite experience.

The communications module 200 includes a URL web filter 210. The URL web filter 210 is generally an integrated content filtering software application. One example of a URL web filter is the Barracuda Web Filter™ made by Barracuda Networks, Inc. in Campbell, Calif. The URL web filter 210 may be operated to block or permit access to URLs or selected applications at different times and for different reasons.

The URL web filter 210 may have its settings commanded by a data register 220. Programs, URLs, and other data that can be used in operating the URL web filter 210 are stored in a data register memory 230. The data register memory 230 contains data indicative of URLs which can be blocked or allowed. For purposes of the present description, URL may also include a particular page within a domain. A page is indicated by the form www.URL.com/page. The domain register memory 230 is addressed by a program register 240. The program register 240 selects a currently desired set of URLs to be allowed. The selections are mapped into memory locations within the data register memory 230. Outputs from the data register memory 230 are loaded into locations of the data register 220. The data register 220 provides settings to the URL web filter 210.

The selections made by the program register 240 in a preferred form, may be correlated with a mode of operation of the system 2. A program table 250 is loaded with sets of information corresponding to different concert functions. Each concert function defines a set of permissions for respective groups of URLs. A program interface 260 receives inputs, such as from the control system 16 or the program control system 8 (FIG. 1).

All outgoing Internet traffic from participating devices is filtered by a filtering appliance in-line with the network topology after the Wi-Fi access points. This filter blocks all URL requests except for those required for business logic of the application or for proper operation of the end-device. The business logic may require access to specific URLs for the purposes of retrieving user-specific data such as social networking profile (e.g., a Facebook® profile). The application controls which specific URLs are being selected. The filter can be configured such that only those desired URLs can be accessed. All other requests to access general URLs, e.g., requests to youtube.com for YouTube® content or cnn.com for CNN® content, are blocked.

It may be preferable to provide some access to URLs that would otherwise be blocked in accordance with the above rules. Some wireless devices behave poorly when a seemingly valid Internet connection does not allow connection to specific vendor-owned domains. The Apple iPhone®, for example expects to be able to connect to apple.com periodically (when not in Airplane mode) and when a valid Internet connection and IP address have been obtained or assigned in the network configuration section. When denied connection to some specific locations the device can behave strangely including providing a very slow Internet connection, repeated connection attempts, busy-loops, etc. Therefore, connections to these specific vendor-owned domains will be allowed to the minimum necessary extent.

Data can be translated by a compression algorithm for further transmission.

Figure 4:
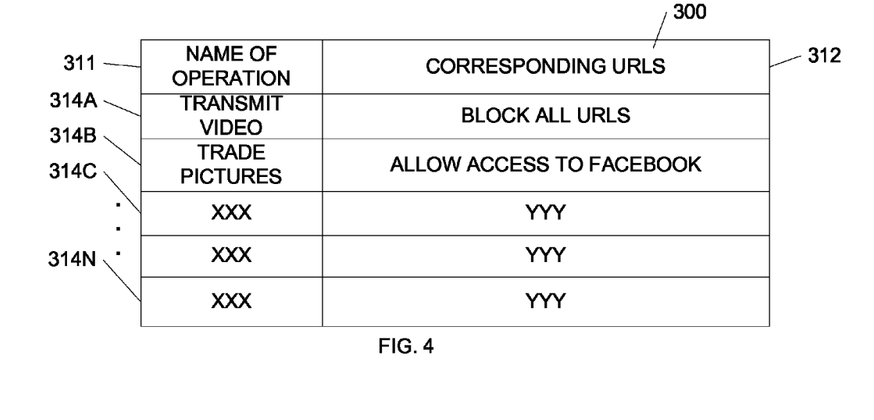
FIG. 4 is a chart illustrating programming of a web filter.

FIG. 4 is a chart 300 illustrating programming of the web filter 210. A column 311 includes the names of phases of operation. Corresponding URLs and applications are listed in column 312. Any number of rows 314a, 314b, 314c ... 314n may be provided, where n is an integer. For example, row 314a may correspond to a video presentation. During this phase of operation, it is desired to transmit video data to the portable user devices 6. Interaction between individual portable user devices 6 is not desired. Therefore, all URLs are blocked and only the Wi-Fi signals from the concert network controller 100 to the portable user devices 6 are allowed. The program interface 260 (FIG. 3) informs the program table 250 that a video phase is being conducted. A set of data is selected corresponding to the Wi-Fi program, and transmitted to the program register 240. In accordance with this instruction, the program register 240 addresses the data register memory 230, which will in turn provide settings to the data register 220.

In another phase, it may be desirable to provide interactivity to allow trading of pictures among concert goers. In this situation, data in a line 314b titled "trade pictures" may be utilized. This includes using the Wi-Fi network and allowing access to, for example, Facebook® or another social network which can store pictures. The program selector is set by the interface 260 and the program register 240 selects programs corresponding to the current mode of operation. The data register memory 230 is addressed accordingly, and settings are provided from the data register 220 to the web filter 200.

The required application use for Internet-obtained data is very minimal. For example, a social network (e.g., Facebook®) may be accessed only for the purpose of downloading a user's profile picture. Optional applications that are allowed and which have greater bandwidth requirements are throttled to a low level that allows the application to obtain the data it requires over time. This operation may be further facilitated by the use of chunked transmission of information. Chunked transfer encoding is a mechanism that allows HTTP messages to be split in several parts. This can be applied to both HTTP requests (from client to server) and HTTP responses (from server to client). If a server wants to start sending a response before knowing its total length, it might use simple chunked transfer-encoding, which breaks the complete response into smaller chunks and sends them in series. Consequently, a download may be transmitted between the server and client one chunk at a time rather than in a single transmission. Since the operation of transmitting the information may be interrupted, real-time access to an entire message from the selected URL is not required. Therefore, bandwidth requirements are reduced. Once the end of the message is received, the destination target can communicate a completed status to the concert controller 100, for example.

Offloading message handling capacity requirements from the event server 130 to the staging server 136 further reduces bandwidth requirements. Messages from external participants can be pre-processed by the Staging Server 136 to determine if indeed these messages must in fact be sent all the way to the Event Server 130. If so, then they can be further processed via compression and/or consolidation into a single larger message or via a specially defined message that allows for partial or chunked transmission of this information. Typically, however, externally delivered messages can be processed fully on the staging server 136 without need to contact the event server 130 at all.

Messages which typically do need to be forwarded to the Event Server 130 are the initial registration messages and video/stills created by external users. However, in this latter case, artifacts can be pulled down selectively by a human user based on thumbnails rather than sending the entire file down all the time from all submissions.

The above description is provided to enable any person skilled in the art to make or use the present invention. Various modifications to these aspects will be readily apparent to those skilled in the art, and the generic principles defined herein may be applied to other aspects without departing from the spirit or scope of the invention. For example, one or more elements can be rearranged and/or combined, or additional elements may be added. A wide range of systems may be provided consistent with the principles and novel features disclosed herein.

What is claimed is:

1. A method for providing a shared interactive audience enhanced experience in a venue at an event comprising:
coupling a concert network controller and one or more portable interactive devices by a local communications link;
linking the concert network controller to an Internet connection;
selecting content accessible from the Internet connection via the concert network controller for inclusion in the audience enhanced experience;
collecting requested data from the Internet connection and providing the data to the concert network controller;
defining a set of business logic Uniform Resource Locators to include a first set of Uniform Resource Locators used for maintaining operation of one or more operating systems of the one or more portable interactive devices;
including in the set of business logic Uniform Resource Locators, a second set of Uniform Resource Locators which permit the one or more portable interactive devices to access data in preselected categories;
providing a Uniform Resource Locator web filter in said concert network controller and setting the Uniform Resource Locator web filter to allow requests for Uniform Resource Locators in the set of business logic Uniform Resource Locators; and
blocking requests for other Uniform Resource Locators not in the set of business logic Uniform Resource Locators.

2. A method according to claim 1 further wherein the step of blocking requests for other Uniform Resource Locators comprises blocking all of the other Uniform Resource Locators.

3. A method according to claim 2 wherein the step of defining a set of business logic Uniform Resource Locators comprises defining a plurality of sets of business logic Uniform Resource Locators, each said comprising Uniform Resource Locators associated with a particular function to be performed within a particular time window and setting the Uniform Resource Locator web filter to allow requests for a respective set of business logic Uniform Resource Locators during a time period in which the particular function is performed.

4. A method according to claim 3 wherein the set of business logic Uniform Resource Locators is defined to include Uniform Resource Locators for gathering information about selected audience members from social networks.

5. A method according to claim 4 wherein the step of transmitting requested data to the concert network controller comprises transmitting to the concert network controller by chunked transmission.

6. A method according to claim 4 further comprising the step of gathering in the concert network controller data accessed by the one or more portable interactive devices.

7. A method for providing a shared interactive audience enhanced experience in a venue at an event comprising:
   providing a venue for an event in which a shared user experience is provided to audience members in the venue in which Internet access is available only through an Internet connection at the venue;
   providing a concert network controller and communicating with one or more portable interactive devices of audience members via a local wireless network;
   linking the concert network controller to an Internet connection for gathering content for use in the shared interactive audience experience;
   linking the portable interactive devices to the Internet connection via the concert network controller;
   receiving content from the Internet connection via transmission of Uniform Resource Locator requests from the concert network controller or the one or more portable interactive devices;
   defining a set of business logic Uniform Resource Locators for operation of the interactive audience enhanced experience including access of data in preselected categories by the concert network controller;
   filtering the Uniform Resource Locator requests and permitting the business logic Uniform Resource Locator requests through the filter; and
   blocking other Uniform Resource Locator requests not in the set of business logic Uniform Resource Locators.

8. A method according to claim 7 wherein the step of defining a set of business logic Uniform Resource Locators comprises defining a plurality of sets of business logic Uniform Resource Locators, each said comprising Uniform Resource Locators associated with a particular function to be performed within a particular time window and setting the Uniform Resource Locator web filter to allow requests for a respective set of business logic Uniform Resource Locators during a time period in which the particular function is performed.

9. A method according to claim 8 further comprising the step of gathering in the concert network controller data accessed by the one or more portable interactive devices.

10. A non-transitory machine-readable medium that provides instructions, which when executed by a processor, causes said processor to perform operations comprising:
    coupling a concert network controller and one or more portable interactive devices by a local communications link;
    linking the concert network controller to an Internet connection;
    selecting content to be obtained from the Internet connection via the concert network controller for inclusion in the audience enhanced experience;
    collecting requested data from the Internet connection and providing the data to the concert network code controller;
    defining a set of business logic Uniform Resource Locators;
    providing a the Uniform Resource Locator web filter in said concert controller and setting the Uniform Resource Locator web filter to allow a requests for Uniform Resource Locators in the set of business logic Uniform Resource Locators;
    including in said set of business logic Uniform Resource Locators additional Uniform Resource Locators for maintaining operation of one or more operating systems of the one or more portable interactive devices; and
    blocking requests for other Uniform Resource Locators not in the set of business logic Uniform Resource Locators.

11. A non-transitory machine-readable medium according to claim 10 wherein the step of defining a set of business logic Uniform Resource Locators comprises defining a plurality of sets of business logic Uniform Resource Locators, each said comprising Uniform Resource Locators associated with a particular function to be performed within a particular time window and setting the URL web filter to allow requests for a respective of business logic Uniform Resource Locators during a time period in which the particular function is performed, and further comprising the step of gathering in the concert network controller data accessed by portable interactive devices.

12. A non-transitory machine-readable medium according to claim 11 wherein transmitting requested data to the concert network controller comprises transmitting to the concert network controller by chunked transmission.

13. A system in which a concert network controller interacts with portable interactive devices in a venue to provide a shared user experience comprising:
    a concert network controller;
    a local communications link linking one or more portable interactive devices and the concert network controller;
    a link for interfacing the concert network controller to an Internet connection for transmitting Uniform Resource Locator requests and for receiving content from the Internet connection for inclusion in the audience enhanced experience; and
    a Uniform Resource Locator web filter capable of:
      defining a set of business logic Uniform Resource Locators;
      allowing the Uniform Resource Locator requests in the set of business logic Uniform Resource Locators;
      including in said set of business logic Uniform Resource Locators additional Uniform Resource Locators for maintaining operation of one or more operating systems of the one or more portable interactive devices; and
      blocking other Uniform Resource Locator requests not in the set of business logic Uniform Resource Locators.

14. A system according to claim 13, wherein defining a set of business logic Uniform Resource Locators, further comprises defining a plurality of sets of business logic Uniform Resource Locators, each said comprising Uniform Resource Locators associated with a particular function to be performed within a particular time window and setting the URL web filter to allow requests for a respective of business logic Uniform Resource Locators during a time period in which the particular function is performed, and further comprising the step of gathering in the concert network controller data accessed by portable interactive devices.

* * * * *